United States Patent Office 2,911,416
Patented Nov. 3, 1959

2,911,416

TRIMELLITIC DOUBLE ANHYDRIDE

James O. Knobloch, Hobart, Ind., and Hsiang P. Liao, Park Forest, Ill., assignors to Standard Oil Company, Chicago, Ill., a corporation of Indiana No Drawing. Application July 30, 1958
Serial No. 751,844

4 Claims. (Cl. 260—346.3)

This invention relates to a derivative of trimellitic acid and more specifically pertains to the double anhydride of trimellitic acid.

Trimellitic acid, 1,2,4-tricarboxybenzene, has been known for some time. Because of the 3 carboxyl groups, trimellitic acid is an interesting and useful chemical compound. For example, ester derivatives of this trimellitic acid can be prepared from mono alcohol. From diols and other poly alcohol, various poly esters can be prepared. Triallyl esters have been suggested as reactants with other olefinic compounds to produce high molecular weight derivatives.

The intra-molecular anhydride of trimellitic acid is also known. As would be expected, the intra anhydride, i.e., the anhydride formed by the elimination of a molecule of water between the carboxyl groups on adjoining carbon atoms is more reactive than the acid. The intramolecular anhydride can be employed in a preparation of the ester derivative of trimellitic acid. Since water has a retarding effect on ester formation, the intramolecular anhydride is preferred as a reactant for forming such esters, since only the esterification of one carboxyl group produces water.

The double anhydride of trimellitic acid, i.e., an intermolecular anhydride of two mols of intramolecular anhydride is more reactive than the intramolecular anhydride of trimellitic acid or trimellitic acid. Also an advantage of the inter-intramolecular or double anhydride is that it can be reacted with more alcohol than the intramolecular anhydride without the formation of water. For example, the intramolecular anhydride reacts with one mol of monoalcohol without forming water, but the double anhydride will react with three mols of monoalcohol without the formation of water to form a mixture of mono and diester. Another advantage is that substantially complete reaction of all the potential carboxylic acid groups in an esterification process will take place. An additional advantage is obtained in resin formation by reacting the double anhydride with a polyol. For example, one mol of the double anhydride will react with six mols of a diol splitting out three mols of water whereas two mols of the intramolecular anhydride reacting with six mols of a diol splits out four mols of water. Using the double anhydride 25% less water is formed when united with a diol thus simplifying and reducing the removal of water during the preparation of resinous products.

The double anhydride (inter-intramolecular anhydride) of trimellitic acid can be readily and conveniently prepared by heating at the boiling point (135°–140° C.) of the mixture, trimellitic anhydride (intramolecular) and the acetic anhydride in the proportions of at least 5 mols, desirably 5 to 10 mols and preferably about 7 mols, of the acetic anhydride per mol of intramolecular anhydride. The mixture is boiled under refluxing conditions until a mixed anhydride of trimellitic anhydride (intramolecular) and acetic acid is formed. With further heating, preferably at higher temperature and reduced pressure, acetic anhydride is eliminated to yield the inter-intramolecular double anhydride of trimellitic acid. Other lower aliphatic monocarboxylic acid anhydrides may be used in place of acetic anhydride. Another advantage of the use of the double anhydride is that a new route is made possible to new compounds. Mixed esters of trimellitic acid wherein two ester groups are the same and the third is different are possible by esterifying the double anhydride with a mono alcohol, separating the mono and diester formed and the third carboxyl group of the diester is esterified with another alcohol.

More specifically, the double anhydride of trimellitic acid is prepared by heating at the boiling point 30 parts by weight of trimellitic anhydride (acid number 880) and 108 parts by weight of acetic anhydride in a heated reaction vessel equipped with a reflux condenser and protected with a drying tube and heating under refluxing conditions at 130° C. for one hour. Excess acetic anhydride and the acetic acid formed are then removed by distillation to a vapor temperature of 138° C. at atmospheric pressure. The residue is heated at 150° under 13 mm. Hg absolute pressure for an additional 25 minutes to remove more acetic anhydride. The remaining material is dried at 65° C. at reduced pressure. The acid number of the dried material is 921.3. Recrystallization from ethyl acetate (that had been purified by treatment with sodium carbonate, dried over potassium carbonate and distilled) gives a solid whose melting point is 220.7–224.7° C. and whose acid number is 916. An analysis of this solid gives the following: 59.00% carbon and 1.82% hydrogen. The carbon and hydrogen content calculated for $C_{18}H_6O_9$ is 59.0% carbon and 1.65% hydrogen. The calculated acid number is 920.

Thus the material prepared by the above reaction has been characterized as bis (trimellitic anhydride) anhydride having the following formula:

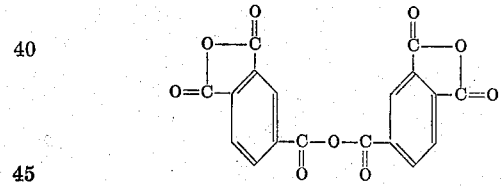

The double anhydride of trimellitic acid can also be prepared by heating trimellitic acid at 216° C. until the intramolecular anhydride is formed and then reducing the temperature to 135 to 140° C. and heating the intramolecular anhydride with at least 5 mols acetic anhydride per mol of anhydride at the boiling point of the resulting mixture, 135° C. to 140° C., at atmospheric pressure. The double anhydride can also be prepared by heating trimellitic acid in the presence of a material forming an azeotrope with water and removing the azeotropic mixture, recovering the intramolecular anhydride and converting it to the double anhydride as before.

What is claimed is:

1. The inter-intramolecular anhydride of two mols of trimellitic acid having the formula:

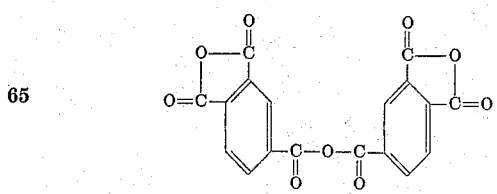

2. The method of preparing the inter-intramolecular anhydride of trimellitic acid which comprises heating trimellitic acid intramolecular anhydride with at least five mols of lower aliphatic acid anhydride at the boiling point of the mixture and removing the aliphatic acid and aliphatic acid anhydride from the resulting mixture.

3. The method of preparing the inter-intramolecular anhydride of trimellitic anhydride which comprises heating trimellitic acid intramolecular anhydride with at least five mols of acetic anhydride per mol of said trimellitic anhydride at the boiling point of the mixture, and removing the acetic acid and anhydride from the resulting mixture.

4. The method of claim 3 wherein the amount of acetic anhydride is seven mols per mol of trimellitic acid intramolecular anhydride and the mixture is heated at 138° C. under reflux conditions.

No references cited.